United States Patent [19]

Hutchison

[11] Patent Number: 4,747,257
[45] Date of Patent: May 31, 1988

[54] WEIGHT TRANSFER CONTROL FOR A FRONT MOUNT MOWER

[75] Inventor: Wayne R. Hutchison, Mayville, Wis.

[73] Assignee: Deere & Company, Moline, Ill.

[21] Appl. No.: 862,860

[22] Filed: May 13, 1986

[51] Int. Cl.⁴ .................................................. A01D 34/03
[52] U.S. Cl. ......................................... 56/15.8; 56/15.9; 56/16.3; 56/208; 280/405 B
[58] Field of Search ............... 56/15.2, 15.8, 15.9, 56/208, 16.3, DIG. 22; 172/657; 280/405 B, 481, 496

[56] References Cited

U.S. PATENT DOCUMENTS

| | | | |
|---|---|---|---|
| 2,240,292 | 4/1941 | Frederiksen | 56/16.3 |
| 2,769,295 | 11/1956 | Northcote | 56/15.8 |
| 3,654,749 | 4/1972 | Ostergren et al. | 56/15.8 |
| 3,706,186 | 12/1972 | Hurlburt et al. | 56/15.8 |
| 3,706,188 | 12/1972 | Quiram | 56/15.8 |
| 4,120,136 | 10/1978 | Rose | 56/17.1 |
| 4,175,765 | 11/1979 | Murphy | 56/15.8 X |
| 4,310,997 | 1/1982 | Streicher | 56/15.9 |
| 4,325,211 | 4/1982 | Witt et al. | 56/15.8 |

FOREIGN PATENT DOCUMENTS 844284  6/1970  Canada .................................. 56/15.8

Primary Examiner—Stephen J. Novosad
Assistant Examiner—John F. Letchford
Attorney, Agent, or Firm—Henderson & Sturm

[57] ABSTRACT

A weight transfer control for a front mount mower including a foot pedal actuated mechanical linkage to selectively transfer a portion of the mower weight to the drive vehicle. The operator can easily and quickly engage and disengage the weight transfer control as the mowing conditions and terrain dictate. The foot pedal, through a series of control links, actuates or winds a torsion spring which will transfer a large portion of the mower weight to the drive vehicle.

14 Claims, 4 Drawing Sheets

WEIGHT TRANSFER CONTROL FOR A FRONT MOUNT MOWER

TECHNICAL FIELD

This invention relates to weight transfer devices, and more particularly to a selectively applied weight transfer control for a front mounted riding mower.

BACKGROUND ART

Front mount mowers typically have traction problems when operating on slopes. The front mower deck generally is supported on caster wheels and is pushed over the area to be mowed by the drive vehicle. When traveling up a slope, the center of gravity of the vehicle is shifted toward the rear. This shift reduces the weight on the front drive wheels and allows them to slip more easily. It is therefore desirable to lift a large portion of the mower weight from the caster wheels to shift the vehicle's center of gravity forward, thereby transferring weight to the drive wheels when traveling up a slope. To provide for even cutting, a small portion of the mower weight must be supported by the caster wheels so that they will remain in contact with the ground at all times.

When traveling down a slope, or when making sudden stops, the rear of the vehicle becomes light and unstable which results in a loss of steering control. When operating under these conditions, the forward shift of the vehicle's center of gravity is undesirable.

A conventional means of transfering the weight of a front mount mower to the drive vehicle is to interconnect the mower and the vehicle with springs. This approach has proved to be less than satisfactory, however, since the weight is transferred at all times, including times when conditions make the weight transfer undesirable. Another approach is to use a hydraulic lift with a valve to control the pressure. This solution is very costly and is generally considered economically impractical for the small front mounted mower.

Those concerned with these and other problems recognize the need for an improved weight transfer control for a front mount mower.

DISCLOSURE OF THE INVENTION

The present invention provides a weight transfer control for a front mount mower including a foot pedal actuated mechanical linkage to selectively transfer a portion of the mower weight to the drive vehicle. The operator can easily and quickly engage and disengage the weight transfer control as the mowing conditions and terrain dictate. The foot pedal, through a series of control links, actuates or winds a torsion spring which will transfer a large portion of the mower weight to the drive vehicle.

The linkage of the weight transfer control includes a float slot that allows for vertical float of the mower deck without movement of the foot pedal. The weight transfer control also includes a preload spring that transfers a small portion of the mower weight to the drive vehicle at all times. An over-center extension spring biases the foot pedal to the disengaged position and then acts to reduce the effort required to depress the pedal.

The weight transfer control of the present invention allows the operator to selectively transfer the mower weight when it is needed for climbing hills and other low traction conditions, without sacrificing stability and steering control.

An object of the present invention is the provision of an improved weight transfer control for a front mount mower.

Another object is to provide a selective weight transfer control that is easily and quickly engaged and disengaged as the operator encounters varying mowing conditions.

A further object of the invention is the provision of a weight transfer control for a front mount mower that is inexpensive to manufacture.

Still another object is to provide a weight transfer control that can selectively transfer up to about eighty percent (80%) of the mower weight to the drive vehicle.

A still further object of the present invention is the provision of a weight transfer control for a front mount mower that is easy to operate and maintain.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
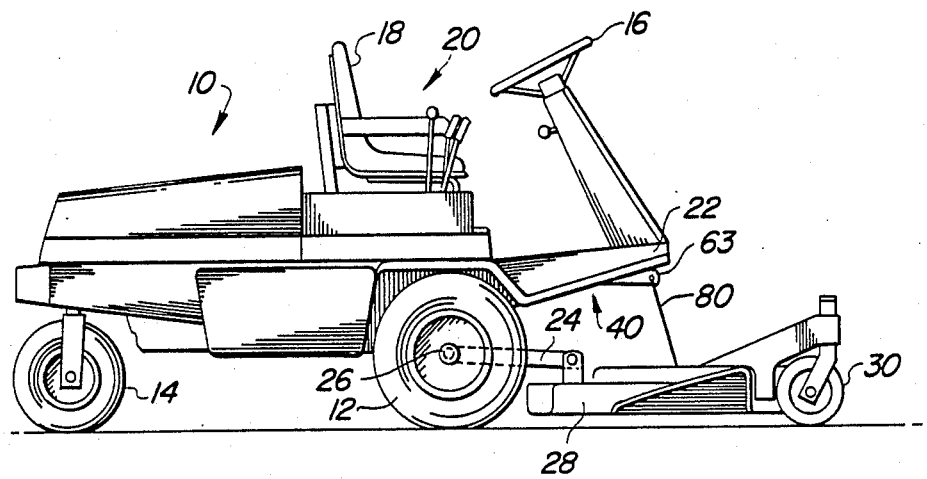
FIG. 1 is a side elevational view of a front mount mower until the weight transfer control of the present invention.

Referring now to the drawings, wherein like reference numerals designate identical or corresponding parts throughout the several views, FIG. 1 shows a drive vehicle (10) supported by a pair of front drive wheels (12) and a single rear wheel (14) operably connected to the operator's steering wheel (16). When occupying the seat (18), the operator has convenient access to the hand actuated controls (20) and the foot actuated controls (not shown) located at the forwardmost end of the vehicle deck (22). A pair of push arms (24) extend forward from the front drive axle (26) and are attached to the mower deck (28). A pair of caster wheels (30) support the forward portion of the mower deck (28) at one of a number of adjustable cutting heights.

Figure 2:
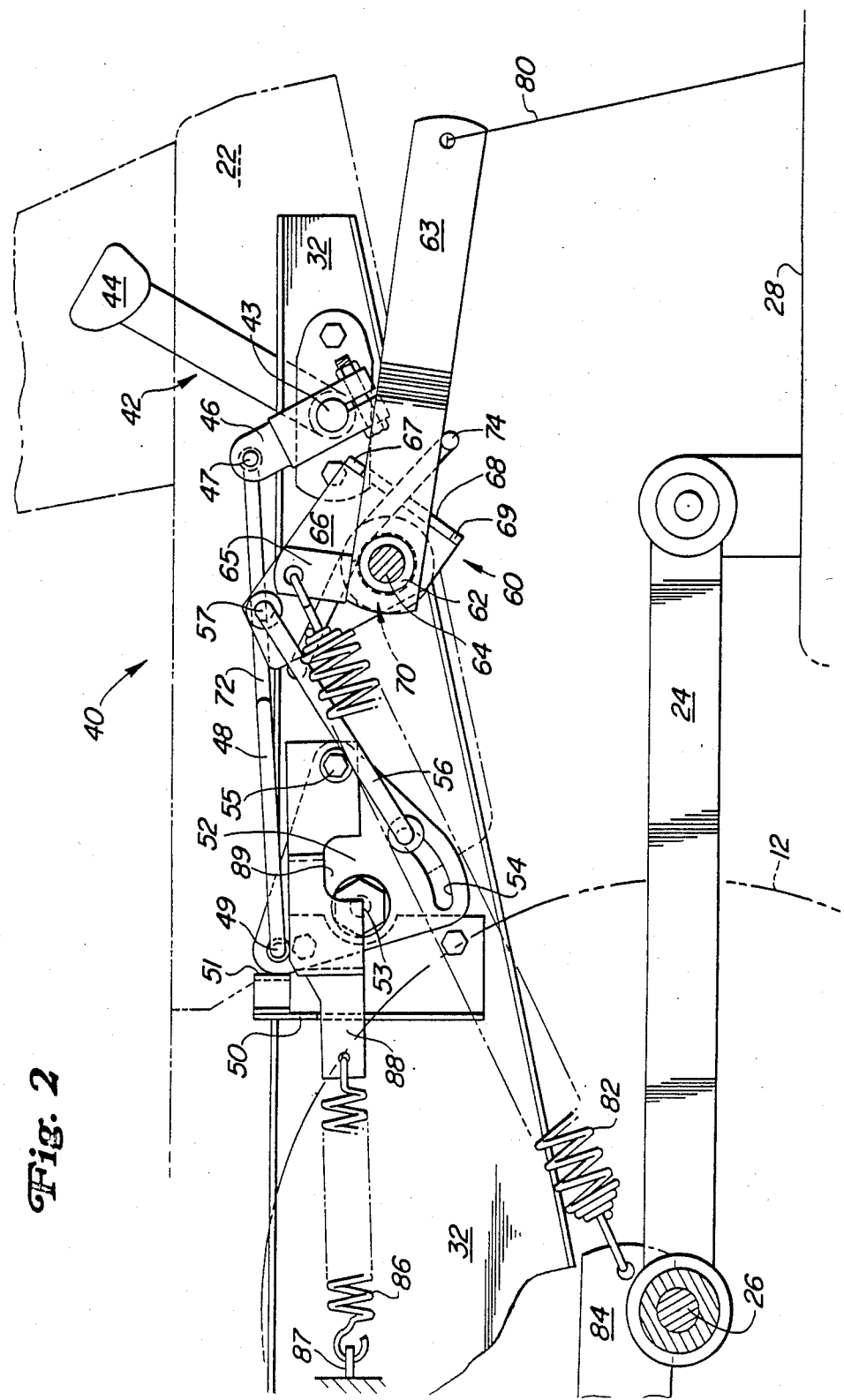
FIG. 2 is an enlarged side elevation sectional view showing the weight transfer control in the disengaged mode, wherein about twenty percent (20%) of the mower weight is transferred to the drive vehicle through the action of the preload spring.
Figure 4:
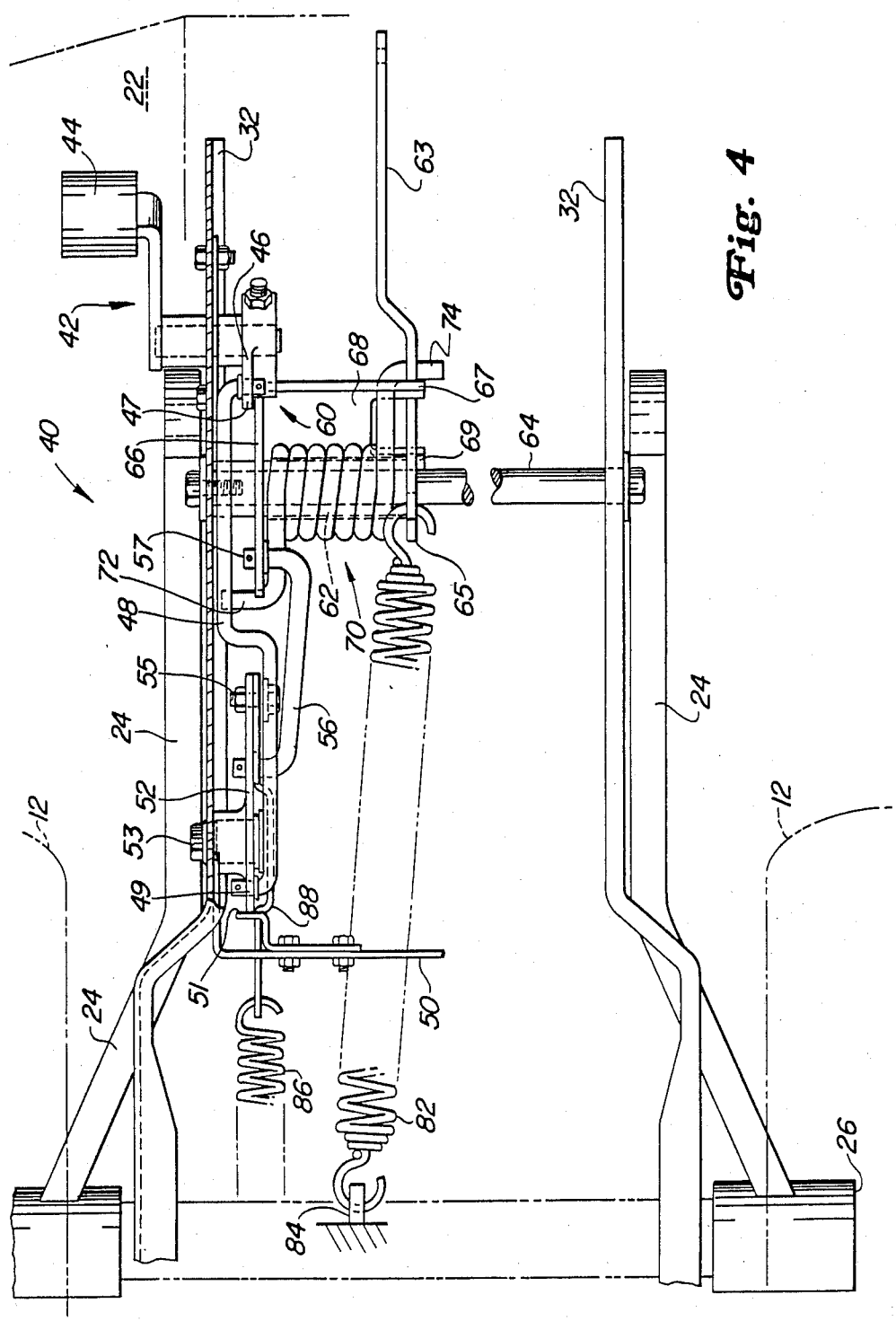
FIG. 4 is an enlarged top plan sectional view showing the weight transfer control in the disengaged mode as in FIG. 2.

The weight transfer control (40) of the present invention includes a mechanical linkage mounted on the underside of the vehicle deck (22). As best shown in FIGS. 2 and 4, the weight transfer control (40) is mounted generally forward of the drive axle (26) and generally between the frame rails (32) that support the vehicle deck (22). A foot pedal (42) is journalled for rotation about a point (43) in the left-hand frame rail (32). The pedal (42) includes a non-slip foot pad (44) that extends out from and above the vehicle deck (22). A pedal crank arm (46) extends inside the left-hand frame rail (32) and is attached at a point (47) to one end of an S-shaped connecting link (48). The opposite end of the link (48) is attached at a point (49) to a triangularly-shaped bell crank (52).

The bell crank (52) is mounted on the left-hand frame rail (32) and is disposed to rotate about a point (53). Rotation of the bell crank (52) is limited by a stop plate (51) attached to the cross member (50). One end of a C-shaped connecting link (56) is received in an arcuate slot (54) formed in the lower portion of the bell crank (52) and the opposite end of the link (56) is attached at a point (57) to an L-shaped weight transfer bracket (60).

The L-shaped bracket (60) is supported by an elongated sleeve (62) having its inside surface rotatably received on a lift shaft (64) which extends between the frame rails (32). The bracket (60) includes a fore-and-aft plate (66) and a transverse plate (68) having a notched free end forming upper and lower ears (67) and (69). The coil of a torsion spring (70) is received over the outside surface of the elongated sleeve (62) and a rearwardly extending spring end (72) engages the lower edge of the plate (66) while a forwardly extending spring end (74) is disposed in the notched end of the plate (68) between the ears (67) and (69).

The lift shaft (64) is journalled for rotation in the frame rails (32) and carries a rigidly attached forwardly directed lift lever (63) and an upwardly extending lever tab (65). The lift lever (63) is disposed in the notched end of the plate (68) between the ears (67) and (69) and the underside of the lever (63) is engaged and supported by the forward torsion spring end (74). A flexible cable (80) interconnects the end of the lift lever (63) and the mower deck (28). A preload extension spring (82) is attached between the lever tab (65) and a lug (84) and acts to transfer about twenty percent (20%) of the weight from the mower (28) to the drive vehicle (10) at all times.

Figure 3:
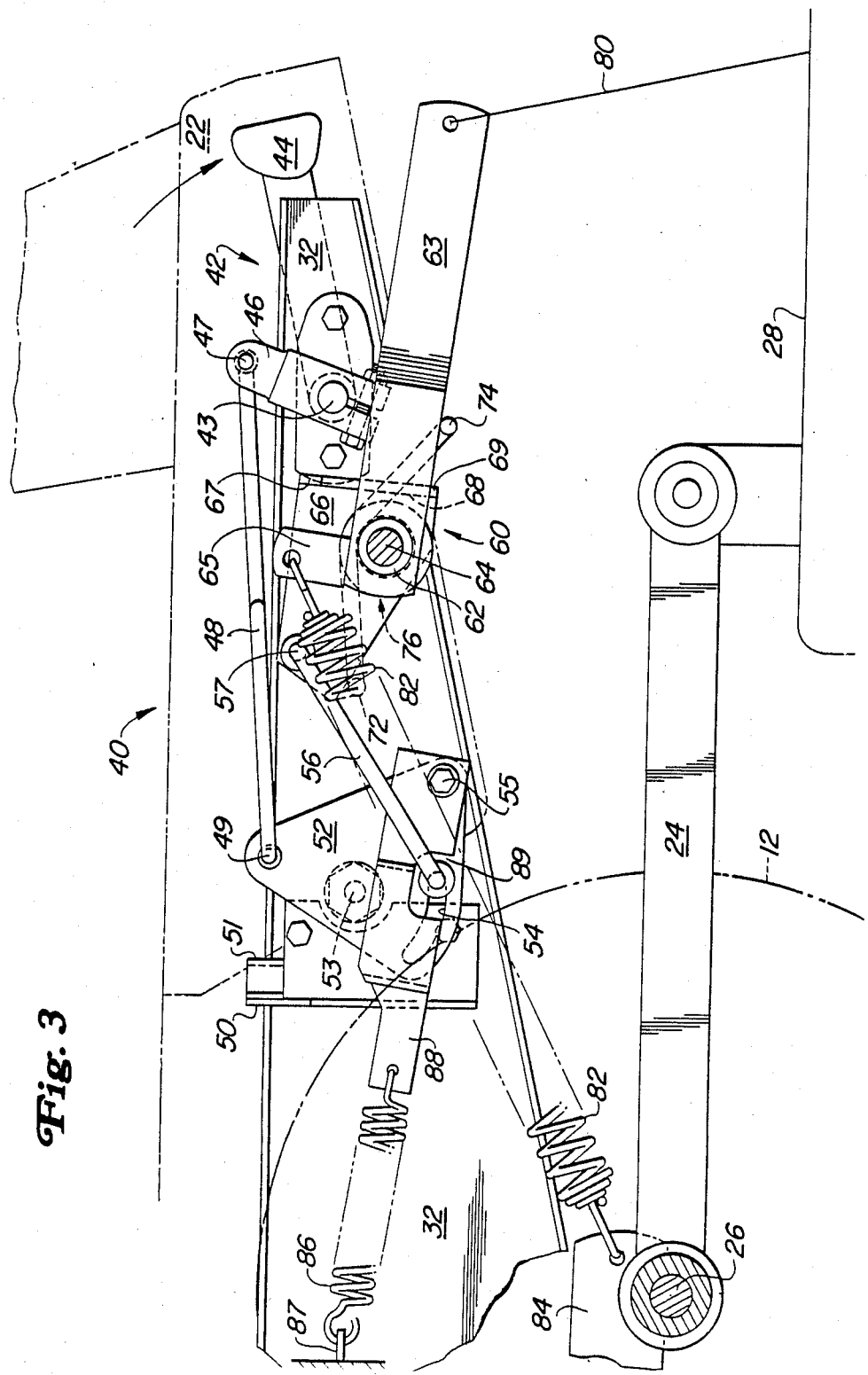
FIG. 3 is an enlarged side elevation sectional view similar to FIG. 2, but illustrating the weight transfer control in the fully engaged mode wherein about eighty percent (80%) of the mower weight is transferred to the drive vehicle through the action of the torsion spring.

A pedal assist extension spring (86) is attached at one end to a lug (87) and at the other end to a connecting strap (88). The strap (88) in turn is attached to the bell crank (52) at a point (55). The strap (88) includes a notched area (89) that provides clearance for the link (56) when the weight transfer control (40) is in the fully engaged mode (FIG. 3). The pedal assist spring (86) acts to bias the foot pedal (42) to the raised position when the line of action is above the pivot point (53) (FIG. 2), and acts to reduce the effort required to depress the foot pedal (42) when the line of action is below the pivot point (53) (FIG. 3).

When in the disengaged mode illustrated in FIGS. 2 and 4, the weight transfer control (40) transfers about twenty percent (20%) of the weight of the mower (28) to the drive vehicle (10) by action of the preload spring (82). When mowing conditions make it desirable to transfer additional weight to the drive vehicle (10), the operator simply depresses the foot pedal (42) to actuate or wind the torsion spring (70) so that from about twenty percent (20%) to about eighty percent (80%) of the mower weight is supported by the torsion spring (70). When in the fully engaged mode, illustrated in FIG. 3, the weight transfer control (40) transfers about eighty percent (80%) of the mower weight to the drive vehicle (10) through action of the torsion spring (70). Sufficient mower weight remains on the caster wheels (30) so that they maintain ground contact at all times to insure even cutting.

To move the weight transfer control (40) from the fully engaged mode to the disengaged mode, the operator simply releases the foot pedal (42) and it returns to the up position by forces exerted by the torsion spring (70) and the pedal assist spring (86). The arcuate slot (54) in the linkage allows the mower deck to float without moving the foot pedal (42). Use of the weight transfer control (40) allows the operator to selectively transfer mower weight to the drive vehicle (10) as the mowing conditions dictate.

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

I claim:

1. In a weight transfer control for use in conjunction with a drive vehicle having a front mounted implement attached thereto, said implement including ground engaging structure disposed to support the weight of said implement, the improvement comprising:
   a manually operated actuator attached to said drive vehicle and being selectively movable between a disengaged position and a fully engaged position by selective application of force by an operator;
   a linkage attached to and interconnecting said actuator and said implement, said linkage including a lift spring disposed to transmit said applied force from said actuator to transfer a portion of the weight of said implement to said drive vehicle; and
   an over-center actuator assist spring attached to and interconnecting said linkage and said drive vehicle, said actuator assist spring being disposed to bias the actuator toward the disengaged position and then aid in reducing the effort required to move the actuator when the actuator assist spring moves to an over-center position.

2. The weight transfer control of claim 1 wherein said actuator is a foot pedal.

3. The weight transfer control of claim 1 wherein said lift spring is a torsion spring.

4. The weight transfer control of claim 1 wherein said lift spring is disposed to support up to about eighty percent (80%) of the weight of said implement when the actuator is in the fully engaged position.

5. The weight transfer control of claim 1 wherein said linkage further includes a float slot, whereby vertical float of the implement is allowed without movement of the actuator.

6. The weight transfer control of claim 1 further including a preload spring attached to and interconnecting said linkage and said drive vehicle, said preload spring being disposed to support and transfer about twenty percent (20%) of the weight of said implement to said drive vehicle when the actuator is in the disengaged position.

7. In a weight transfer control for use in conjunction with a drive vehicle having a front mounted mower attached thereto, said mower including ground engaging wheels disposed to support the weight of said mower, the improvement comprising:
   a manually operated foot pedal attached to said drive vehicle and being selectively movable between a disengaged position and a fully engaged position by selective application of force by an operator;

a linkage attached to and interconnecting said actuator and said mower, said linkage including a torsion lift spring disposed to transmit said applied force from the foot pedal to transfer up to about eighty percent (80%) of the weight of said mower to said drive vehicle when the foot pedal is in the fully engaged position; said linkage further including a float slot, whereby vertical float of the mower is allowed without movement of the foot pedal;

a preload spring attached to and interconnecting said linkage and said drive vehicle, said preload spring being disposed to support and transfer about twenty percent (20%) of the weight of said mower to said drive vehicle when the foot pedal is in the disengaged position; and an over-center foot pedal assist spring attached to and interconnecting said linkage and said drive vehicle, said assist spring being disposed to bias the foot pedal toward the disengaged position and then aid in reducing the effort required to move the foot pedal when the assist spring moves to an over-center position.

8. A weight transfer control mechanism, connected to an implement and a drive vehicle having a drive axle, for controlling the distribution of the weight of the implement between said implement and said drive vehicle, said mechanism comprising:

an actuator, connected to said vehicle, and being selectively shiftable by an operator between a disengaged position and an engaged position;

means, connected to and interconnecting said actuator with said implement, for transferring a portion of the weight of said implement to said drive vehicle while simultaneously maintaining contact between said implement and said ground; and an actuator assist spring connected to and interconnecting said transferring means with said drive vehicle, for biasing said actuator toward said disengaged position and for reducing the effort required to move said actuator when said actuator assist spring moves to an over-center position.

9. The mechanism of claim 8 wherein said actuator is a foot pedal.

10. The mechanism of claim 8 wherein said transferring means further comprises a torsion spring connected to said actuator.

11. The mechanism of claim 8 wherein when said actuator is in said engaged position, approximately 80% of the weight of said implement is transferred to said drive vehicle.

12. The mechanism of claim 8 wherein when said actuator is in the disengaged position, approximately 20% of the weight of said implement is transferred to said drive vehicle.

13. The mechanism of claim 8 wherein said transferring means further comprises:

a linkage connected to said actuator, said linkage having a float slot; and a torsion spring connected to said actuator and said linkage such that said implement is allowed to float vertically without affecting said actuator.

14. The mechanism of claim 13 further comprising:

a preload spring, connected to and interconnecting said linkage and said drive vehicle, for transferring approximately 20% of the weight of said implement to said drive vehicle when said actuator is in said disengaged position.

* * * * *